(12) United States Patent
Rochau

(10) Patent No.: US 11,181,391 B2
(45) Date of Patent: Nov. 23, 2021

(54) SYSTEMS AND METHODS OF DETERMINING FLIGHT PHASE / MOTION STATUS OF AN AIRCRAFT

(71) Applicant: Systems and Software Enterprises, LLC, Brea, CA (US)

(72) Inventor: Andreas Rochau, Wessling (DE)

(73) Assignee: Safran Passenger Innovations LLC, Brea, CA (US)

( * ) Notice: Subject to any disclaimer, the term of this patent is extended or adjusted under 35 U.S.C. 154(b) by 318 days.

(21) Appl. No.: 16/399,483

(22) Filed: Apr. 30, 2019

(65) Prior Publication Data

US 2020/0064151 A1 Feb. 27, 2020

Related U.S. Application Data

(60) Provisional application No. 62/720,610, filed on Aug. 21, 2018.

(51) Int. Cl.
*F02C 9/00* (2006.01)
*G01C 23/00* (2006.01)

(52) U.S. Cl.
CPC .................. *G01C 23/00* (2013.01)

(58) Field of Classification Search
USPC ............................ 340/945, 963, 971; 701/14
See application file for complete search history.

(56) References Cited

U.S. PATENT DOCUMENTS

| | | | |
|---|---|---|---|
| 9,310,222 B1 | 4/2016 | Suiter et al. | |
| 9,796,479 B2 | 10/2017 | Tucker et al. | |
| 2005/0278753 A1 | 12/2005 | Brady et al. | |
| 2014/0136028 A1* | 5/2014 | Ausman | B64C 19/00 701/3 |
| 2016/0347472 A1* | 12/2016 | Williams | B64D 43/00 |
| 2016/0376003 A1 | 12/2016 | Feldman | |
| 2018/0075757 A1* | 3/2018 | Estes | G08G 5/0034 |
| 2020/0148366 A1* | 5/2020 | Fagan | B64D 11/064 |
| 2020/0300176 A1* | 9/2020 | Royer | B64D 31/06 |

FOREIGN PATENT DOCUMENTS

| | | |
|---|---|---|
| EP | 2466568 B1 | 6/2013 |
| EP | 2706386 B1 | 3/2019 |

OTHER PUBLICATIONS

European Patent Office, International Search Report and Written Opinion, dated Jun. 21, 2019.

\* cited by examiner

*Primary Examiner* — Brent Swarthout
(74) *Attorney, Agent, or Firm* — Umberg Zipser LLP; Ryan Dean

(57) ABSTRACT

Systems for determining a flight stage of an aircraft are described in which a vibration sensor and a sensor for determining a pitch of the aircraft are utilized. A server receives signals from the vibration sensor and pitch sensor, and determines the flight stage using a set of algorithms. Depending on the flight stage determined, a command signal can be generated and transmitted to cause one or more components of the aircraft to change in function or power on or off.

11 Claims, 4 Drawing Sheets

SYSTEMS AND METHODS OF DETERMINING FLIGHT PHASE / MOTION STATUS OF AN AIRCRAFT

This application claims priority to U.S. provisional application having Ser. No. 62/720,610 filed on Aug. 21, 2018. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is determining a flight stage of an aircraft.

BACKGROUND

The background description includes information that may be useful in understanding the present invention. It is not an admission that any of the information provided herein is prior art or relevant to the presently claimed invention, or that any publication specifically or implicitly referenced is prior art.

Determining whether an aircraft is in flight or on the ground is generally achieved by accessing an aircraft data bus or receiving discrete signals (e.g., Weight on Wheels). However, such solutions generally only provide information as to whether the aircraft is on the ground or in-flight, requires access to the aircraft's data, and fails to provide information concerning the flight stage of the aircraft when in flight (e.g., ascent, cruise and descent).

Thus, there is still a need for systems and methods for determining a flight phase of an aircraft.

SUMMARY OF THE INVENTION

The inventive subject matter provides apparatus, systems and methods for determining a flight stage of an aircraft. Contemplated systems and methods utilize first and second sensors to obtain information about the aircraft. A first sensor can be utilized to detect a level of vibration at or within an aircraft, and generate a first signal. A second sensor can be used to detect a pitch of the aircraft, and generate a second signal.

A server can be configured to receive the first and second signals, or information therefrom. Using a processor and a set of algorithms, the processor can be configured to determine a flight stage of the aircraft using the set of algorithms and the received first and second signals. Based on the flight stage determined, the processors can be further configured to generate a command signal.

Contemplated flight stages include, for example, at gate, taxi, takeoff (ascent), cruise, and landing (descent).

In some embodiments, a third sensor can be used which is configured to detect vertical acceleration of the aircraft, and generate a third signal. In such embodiments, it is contemplated that the server can be configured to receive the third signal, and determine the flight stage of the aircraft based on the first, second and third received signals and using the set of algorithms.

It is contemplated that the system could comprise an in-flight entertainment system having an in-aircraft wireless network and a plurality of line-replaceable units. Preferably, each of the line-replaceable units is configured to present content to a user via a display in the line-replaceable unit. More detailed descriptions of exemplary line-replaceable units can be found in U.S. Pat. No. 9,015,776 to Bird et al. and U.S. Pat. No. 10,173,605 to Carswell et al.

In some embodiments, the server can be disposed within one of the line-replaceable units. In such embodiments, it is contemplated that there could be multiple sensors and servers to account for discrepancies in the signals received and in case a line-replaceable unit or sensor malfunctions or is otherwise inoperable.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The following description includes information that may be useful in understanding the present invention. It is not an admission that any of the information provided herein is prior art or relevant to the presently claimed invention, or that any publication specifically or implicitly referenced is prior art.

The inventive subject matter describes systems and methods for automatically determining a flight phase of an aircraft. Exemplary flight phases can include, for example, on ground, takeoff (ascent), cruise, and landing (descent). It is especially preferred, though not required, that the systems and methods permit retrofitting of existing aircraft to provide a solution to automatically determine a flight phase of an aircraft where such information is not readily accessible by on-board systems, for example.

Such solutions may require mechanisms that prevent unintentional operation of one or more systems of the aircraft during active flight phases.

Figure 1A:
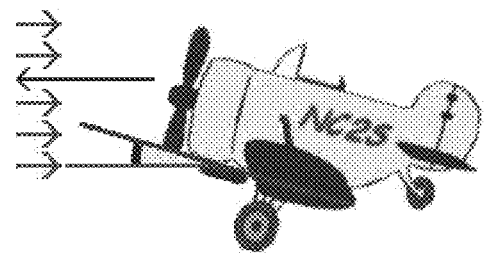
FIG. 1A illustrates an exemplary diagram of an aircraft in a cruise flight phase.

In one embodiment, a system for determining a flight phase of an aircraft comprises an attitude sensor (e.g., tilt/inclination), which can determine a pitch of an aircraft to assist in determining a flight phase of the aircraft. Such sensor is useful to determining a flight phase of an aircraft, especially because an aircraft flies pitch up during cruise, an example of which is shown in FIG. 1A.

Such system can further comprise a vibration sensor and/or a vertical acceleration sensor. Other commercially suitable sensors could also be included depending on the situation.

In one aspect, a line replaceable unit (LRU) of an in-flight entertainment system can comprise a device for automatically determining a flight phase of the aircraft. In some embodiments, the LRU can comprise a computing device having a display, such that movies and other content can be displayed to a passenger via the display of the LRU. In such embodiments, it is contemplated that each seat may have an associated LRU, which may be disposed in seat backs, bulkheads, and so forth. However, each LRU does not necessarily need to include hardware for determining a flight phase, as it is contemplated that information from the system can be shared among devices.

Of course, it is also contemplated that seats may share a LRU, such as one LRU per seat row or other group of seats. Each LRU could further include, for example, a power outlet, a data input (e.g., USB port), and/or a wireless transceiver.

Based on the determined flight phase, the LRU may enable or disable some or all of its functionality and/or send signals to other LRUs, other components of an in-flight entertainment system, or other components of the aircraft to alert them of the determined flight phase. Thus, the LRU could disable its wireless transceiver, for example, while the flight phase is one of the following: "on ground", "taxi", and "landing". The LRU could also disable neighboring LRUs and/or a wireless network of the aircraft, for example.

The LRU may comprise an attitude sensor and a vibration sensor, which can collectively be used to determine whether an aircraft is in flight or not. Such sensors can each send a signal to a processor disposed within the LRU, for example, which can analyze the received signals and determine a flight phase based on a preloaded set of algorithms that reflect the outcomes shown in the table below and depend upon vibration and attitude of the aircraft:

| Flight Phase | Vibration Detected? | Tilt/Inclination Detected? |
| --- | --- | --- |
| On Ground/At Gate | No | No |
| Taxi | Yes | No |
| Takeoff | Yes | Yes |
| Cruise | Yes/No* | Yes** |
| Landing | Yes | Yes |

*Vibration alone might not be a sufficient measure to determine aircraft flight phase during cruise, especially in calm conditions, as the sensor may not detect any vibration.
**Aircraft fly slightly pitched up (non-zero tilt) for aerodynamic reasons. This pitch is measurable with an appropriate sensor, such as an attitude sensor.

Figure 1B:
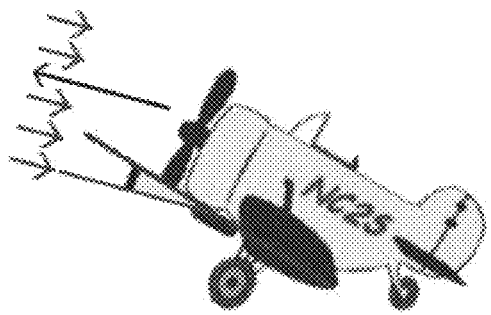
FIG. 1B illustrates an exemplary diagram of an aircraft in an ascent flight phase.

During climb, the measured tilt/inclination angle relative to horizontal will be greater than that measured during takeoff and taxi (e.g., 0 degrees) and cruise. An example of a tilt/inclination of an aircraft during climb (takeoff) is shown in FIG. 1B.

Thus, it is preferred that the algorithms differentiate between takeoff (climb) and cruise by whether the tilt is greater than a predefined threshold. Thus, for example, if the attitude sensor finds a tilt of the aircraft is less than the predefined threshold, the system will determine the aircraft is in a "cruise" flight phase, and if the attitude sensor determines a tilt of the aircraft is greater than or greater than or equal to the predefined threshold, the system will determine the aircraft is in a "takeoff" flight phase.

Figure 1C:
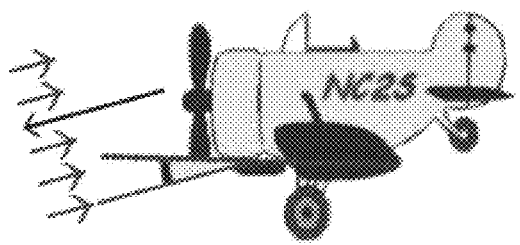
FIG. 1C illustrates an exemplary diagram of an aircraft in a descent flight phase.

During descent (landing), the measured tilt/inclination angle relative to horizontal will generally be negative (e.g., less than that present during takeoff and taxi). An example of a tilt/inclination of an aircraft during descent (landing) is shown in FIG. 1C.

It is further contemplated that the attitude sensor or another sensor can be configured to measure a vertical acceleration of an aircraft. In this manner, even where an aircraft flies at zero pitch during descent, the system can determine the aircraft is in the descent (landing) flight phase as opposed to taxi, for example, by detecting that a vertical acceleration is non-zero.

To simplify the installation of the system, contemplated systems can be configured to self-calibrate. For example, the system can be configured such that the system measures a baseline value of each sensor when the system's power is turned on. The system can be configured to then store each of the baseline values as the baseline value for that sensor, and associate that value with the aircraft being "on ground" or at the gate.

In addition, to prevent unintentional shutdown or inoperability of systems such as where the system is powered on during flight, it is contemplated that the system can be configured to store a history of baseline values and then eliminate any outliers (e.g., those values varying from the stored values or a mean or median value thereof by a specific range).

Figure 2:
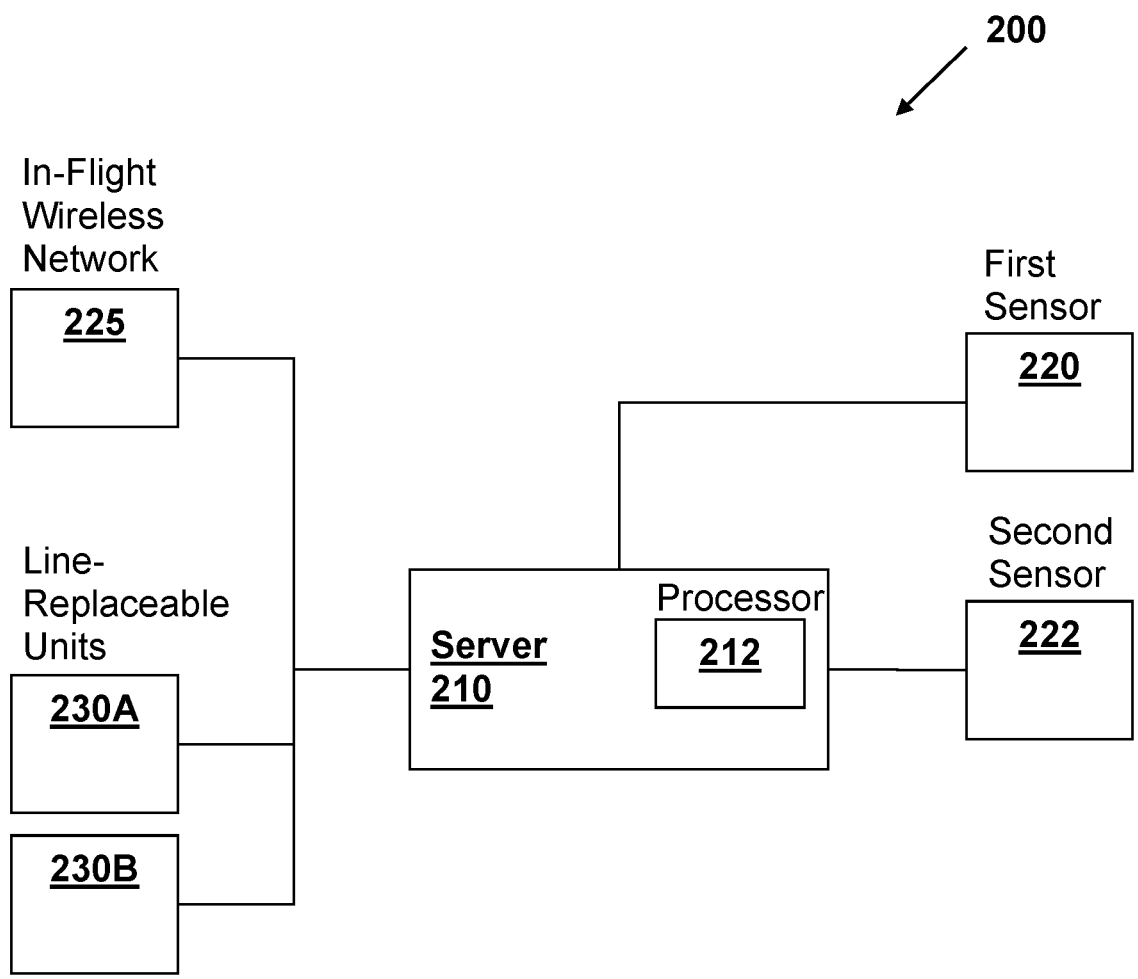
FIG. 2 illustrates one embodiment of a system for determining a flight phase of an aircraft.

FIG. 2 illustrates a diagram of one embodiment of a system 200 for determining a flight stage of an aircraft. The system 200 can include a first sensor 220 configured to detect a level of vibration at or within an aircraft, and generate a first signal. Contemplated first sensors include, for example, a vibration meter and an accelerometer.

The system 200 can include a second sensor 222 configured to detect a pitch of the aircraft, and generate a second signal. Contemplated second sensors include, for example, a gyroscope or an attitude indicator or inertial reference unit.

The system 200 can further include a server 210 having a processor 212 configured to receive the first and second signals and determine a flight stage of the aircraft using a set of algorithms and based on the received first and second signals. It is preferred that the processor 212 can be further configured to generate a command signal based on the determined flight stage.

As discussed above, contemplated flight stages include, for example, at gate, taxi, takeoff (ascent), cruise, and landing (descent).

In some embodiments, the processor 212 is configured to determine the flight stage is "taxi" when the first signal indicates a non-zero level of vibration and the second signal indicates a pitch equal to zero. The processor 212 can be further configured to determine the flight stage is "takeoff" when the first signal indicates a non-zero level of vibration and the second signal indicates a pitch greater than zero, and wherein the pitch is greater than a predefined threshold.

The processor 212 can be further configured to determine the flight stage is "cruise" when the first signal indicates a non-zero level of vibration and the second signal indicates a pitch greater than zero, and wherein the pitch is less than a predefined threshold. The processor 212 can be further configured to determine the flight stage is "landing" when the first signal indicates a non-zero level of vibration and the second signal indicates a pitch less than zero.

In some embodiments, the processor 212 can be configured to request initial sensor information from each of the first and second sensors 220, 222 when power is received by the processor 212 after the system is powered off. In such embodiments, the processor 212 can be further configured to calculate and assign a predefined threshold for vibration and a predefined threshold for pitch based on the received initial sensor information from the first and second sensors.

Thus, for example, when the system 200 is initially powered on, such as when the aircraft is at or near a gate, the processor 212 can request or receive initial readings from the sensors 220, 222 which should indicate zero vibration and zero tilt of the aircraft since the aircraft is not moving and is on the ground. These values can then be assigned to the predefined thresholds for use in later calculating the flight phase of the aircraft. It is contemplated that the initial readings can be saved as a set for reference such that any initial readings that are outside of a certain range from the set of initial readings can be disregarded. This can avoid a situation where the system 200 is power cycled during flight, which may otherwise result in a set of predefined thresholds that are not based on ground measurements.

The command signal generated by the processor 212 could be used to power on or off one or more components of the aircraft including, for example, an in-flight wireless network 225 and one or more line-replaceable units 230A, 230B of an in-flight entertainment system. Alternatively or additionally, the command signal could restrict or enable some or all of the functions of these or other components, such as to prohibit certain uses while the aircraft is in specific flight phases.

Figure 3:
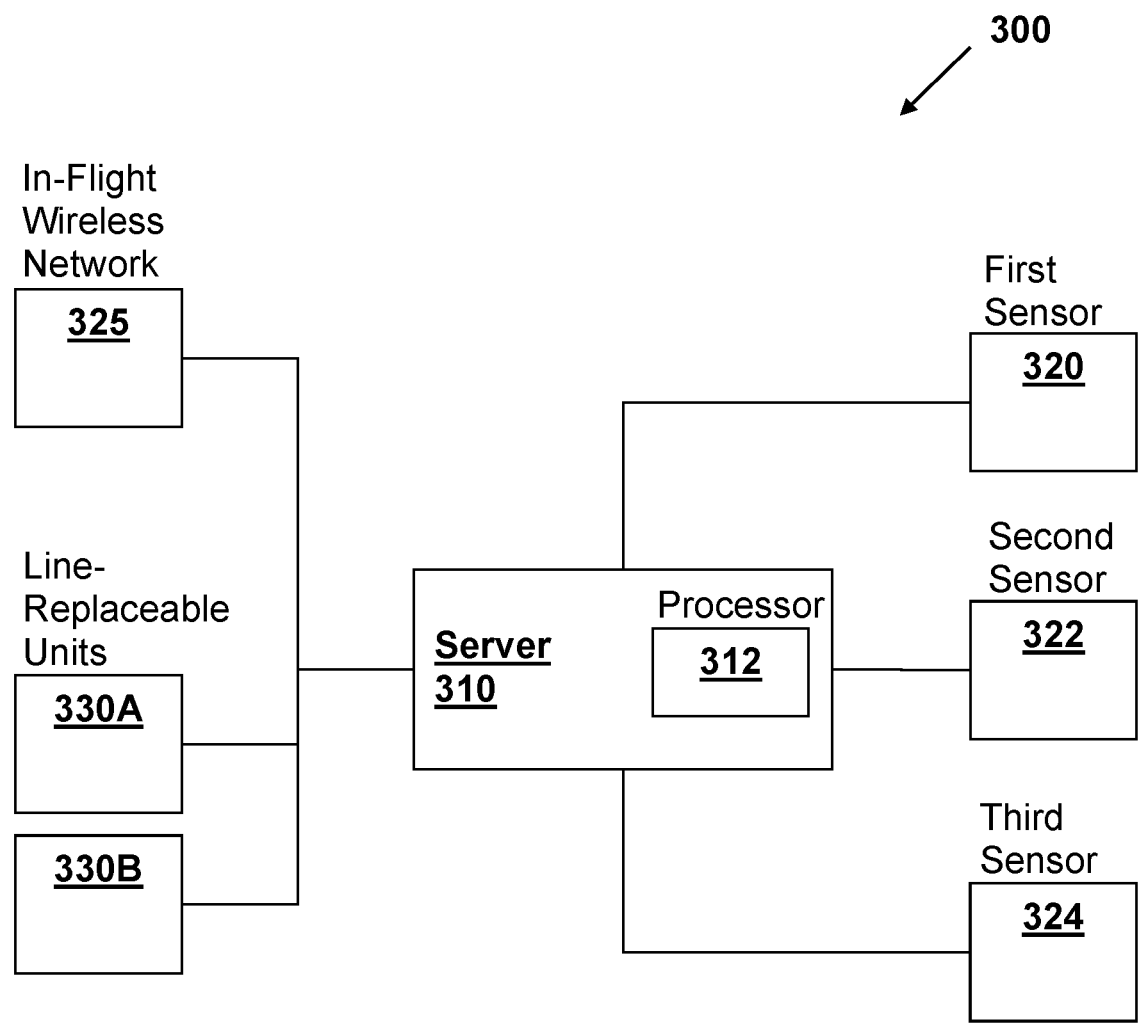
FIG. 3 illustrates another embodiment of a system for determining a flight phase of an aircraft.

FIG. 3 illustrates a diagram of one embodiment of a system 300 for determining a flight stage of an aircraft. The system 300 can include (i) a first sensor 320 configured to detect a level of vibration at or within an aircraft, and generate a first signal, and (ii) a second sensor 322 configured to detect a pitch of the aircraft, and generate a second signal.

The system 300 is similar to the system 200 described above, except the system 300 can include a third sensor 324 configured to detect vertical acceleration of the aircraft, and generate a third signal.

The system 300 can further include a server 310 having a processor 312 configured to receive the first, second and third signals and determine a flight stage of the aircraft using a set of algorithms and based on the received first, second and third signals. It is preferred that the processor 312 can be further configured to generate a command signal based on the determined flight stage.

As discussed above, contemplated flight stages include, for example, at gate, taxi, takeoff (ascent), cruise, and landing (descent).

In some embodiments, the processor 312 is configured to determine the flight stage is "taxi" when the first signal indicates a non-zero level of vibration and the second signal indicates a pitch equal to zero. The processor 312 can be further configured to determine the flight stage is "takeoff" when the first signal indicates a non-zero level of vibration and the second signal indicates a pitch greater than zero, and wherein the pitch is greater than a predefined threshold.

The processor 312 can be further configured to determine the flight stage is "cruise" when the first signal indicates a non-zero level of vibration and the second signal indicates a pitch greater than zero, and wherein the pitch is less than a predefined threshold. The processor 212 can be further configured the processor 312 is configured to determine the flight stage is "landing" when the first signal indicates a non-zero level of vibration, the second signal indicates a pitch equal to zero, and the third signal indicates vertical acceleration of the aircraft.

In some embodiments, the processor 312 can be configured to request initial sensor information from each of the first, second and third sensors 320, 322, 324 when power is received by the processor 312 after the system is powered off. In such embodiments, the processor 312 can be further configured to calculate and assign a predefined threshold for vibration and pitch and an initial value for vertical acceleration based on the received initial sensor information from the first, second and third sensors 320, 322, 324.

Thus, for example, when the system 300 is initially powered on, such as when the aircraft is at or near a gate, the processor 312 can request or receive initial readings from the sensors 320, 322, 324 which should indicate no vibration, no tilt, and no vertical acceleration of the aircraft since the aircraft is not moving and is on the ground. These values can then be assigned to the predefined thresholds for use in later calculating the flight phase of the aircraft. It is contemplated that the initial readings can be saved as a set for reference such that any initial readings that are outside of a certain range from the set of initial readings can be disregarded. This can avoid a situation where the system 300 is power cycled during flight, which may otherwise result in a set of predefined thresholds that are not based on ground measurements.

The command signal generated by the processor 312 could be used to power on or off one or more components of the aircraft including, for example, an in-flight wireless network 325 and one or more line-replaceable units 330A, 330B of an in-flight entertainment system. Alternatively or additionally, the command signal could restrict or enable some or all of the functions of these or other components, such as to prohibit certain uses while the aircraft is in specific flight phases.

Figure 4:
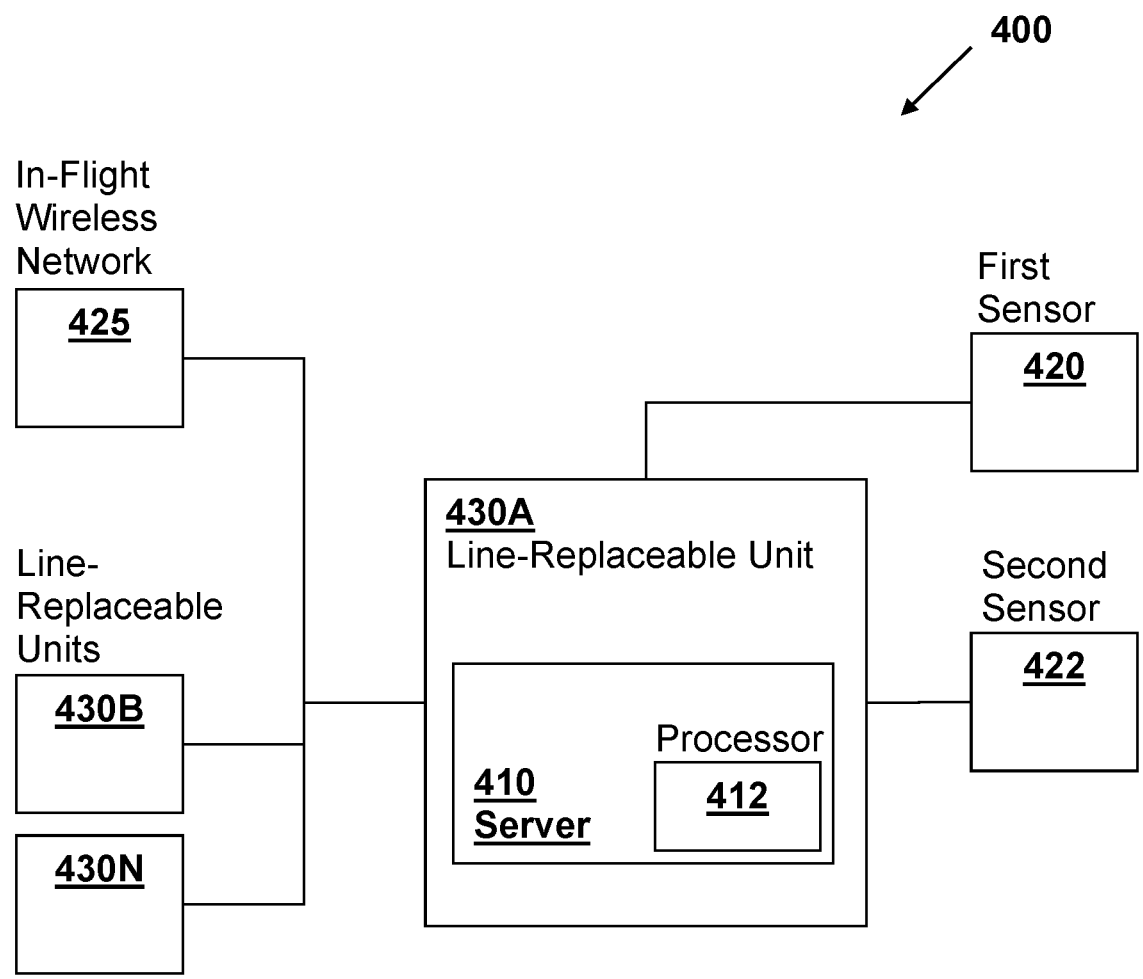
FIG. 4 illustrates another embodiment of a system for determining a flight phase of an aircraft.

FIG. 4 illustrates a diagram of another embodiment of an in-flight entertainment system 400 configured to determine a flight stage of an aircraft. The system 400 can include a plurality of line-replaceable units 430A-430N. As described above, each of the line-replaceable units 430A-430N can include a display coupled with a computing device, such that content can be presented on the display.

One or more of the line-replaceable units 430A can comprise a server 410 having a processor 412 configured to receive a first signal from a first sensor 420 communicatively coupled with the server 410. Preferably, the first sensor 420 is configured to detect a level of vibration at or within an aircraft, and generate the first signal.

The processor 412 can be further configured to receive a second signal from a second sensor 422 communicatively coupled with the server 410. Preferably, the second sensor 422 is configured to detect a pitch of the aircraft, and generate a second signal.

The processor 412 can be further configured to determine a flight stage of the aircraft using a set of algorithms and based on the received first and second signals. It is preferred that the processor 412 can be further configured to generate a command signal based on the determined flight stage.

The command signal can be transmitted to one or more components of the in-flight entertainment system 400, to power on or off the one or more components. In some embodiments, the one or more components could be powered off when the flight stage of the aircraft is at gate, take-off, or landing. Exemplary components could include a line-replaceable unit (e.g., 430B-430N), a power supply, a wireless network 425, and so forth.

In some embodiments, the first and second sensors 420, 422 can be disposed within the line-replaceable unit 430A.

It is contemplated that the processor 412 can be further configured to generate a second command signal to cause at least one of the in-vehicle wireless network 425 and the plurality of line-replaceable units 430A-430N to power off based on the determined flight stage.

In some embodiments, the processor 412 is configured to determine the flight stage is "taxi" when the first signal indicates a non-zero level of vibration and the second signal indicates a pitch equal to zero. The processor 412 can be further configured to determine the flight stage is "takeoff" when the first signal indicates a non-zero level of vibration and the second signal indicates a pitch greater than zero, and wherein the pitch is greater than a predefined threshold.

The processor 412 can be further configured to determine the flight stage is "cruise" when the first signal indicates a non-zero level of vibration and the second signal indicates a pitch greater than zero, and wherein the pitch is less than a predefined threshold. The processor 412 can be further configured to determine the flight stage is "landing" when the first signal indicates a non-zero level of vibration and the second signal indicates a pitch less than zero.

In some embodiments, the processor 412 can be configured to request initial sensor information from each of the first and second sensors 420, 422 when power is received by the processor 412 after the system is powered off. In such embodiments, the processor 412 can be further configured to calculate and assign a predefined threshold for vibration and a predefined threshold for pitch based on the received initial sensor information from the first and second sensors.

Thus, for example, when the system 400 is initially powered on, such as when the aircraft is at or near a gate, the processor 412 can request or receive initial readings from the sensors 420, 422 which should indicate zero vibration and zero tilt of the aircraft since the aircraft is not moving and is on the ground. These values can then be assigned to the predefined thresholds for use in later calculating the flight phase of the aircraft. It is contemplated that the initial readings can be saved as a set for reference such that any initial readings that are outside of a certain range from the set of initial readings can be disregarded. This can avoid a situation where the system 400 is power cycled during flight, which may otherwise result in a set of predefined thresholds that are not based on ground measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for determining a flight stage of an aircraft, comprising:
    a first sensor configured to detect a level of vibration at or within an aircraft, and generate a first signal;
    a second sensor configured to detect a pitch of the aircraft, and generate a second signal;
    a server having a processor configured to receive the first and second signals and determine a flight stage of the aircraft using a set of algorithms and based on the received first and second signals; and
    wherein the processor is further configured to generate a command signal based on the determined flight stage, and wherein the processor is configured to determine the flight stage is one of the following:
        (a) "taxi" when the first signal indicates a non-zero level of vibration and the second signal indicates a pitch equal to zero,
        (b) "takeoff" when the first signal indicates a non-zero level of vibration and the second signal indicates a pitch greater than zero, and wherein the pitch is greater than a predefined threshold,
        (c) "cruise" when the first signal indicates a non-zero level of vibration and the second signal indicates a pitch greater than zero, and wherein the pitch is less than a predefined threshold; or
        (d) "landing" when the first signal indicates a non-zero level of vibration and the second signal indicates a pitch less than zero.

2. The system of claim 1, wherein the flight stage comprises one of the following: at gate, taxi, takeoff, cruise, and landing.

3. The system of claim 1, further comprising:
    a third sensor configured to detect vertical acceleration of the aircraft, and generate a third signal; and
    wherein the processor is further configured to receive the third signal and determine a flight stage of the aircraft based on the first, second and third received signals and using the set of algorithms.

4. The system of claim 3, wherein the processor is configured to determine the flight stage is "landing" when the first signal indicates a non-zero level of vibration, the second signal indicates a pitch equal to zero, and the third signal indicates vertical acceleration of the aircraft.

5. The system of claim 1, wherein the processor is further configured to request initial sensor information from each of the first and second sensors when power is received by the processor after the system is powered off.

6. The system of claim 5, wherein the processor is further configured to calculate and assign a predefined threshold for vibration and a predefined threshold for pitch based on the received initial sensor information from the first and second sensors.

7. A system for determining a flight stage of an aircraft, comprising:
    a first sensor configured to detect a level of vibration at or within an aircraft, and generate a first signal;
    a second sensor configured to detect a level a pitch of the aircraft, and generate a second signal;
    a line-replaceable unit of an in-flight entertainment system, wherein the line-replaceable unit comprises a server having a processor configured to receive the first and second signals and determine a flight stage of the aircraft using a set of algorithms and based on the received first and second signals, wherein the processor is further configured to generate a command signal based on the determined flight stage; and
    wherein the line-replaceable unit is configured to power off a component of the in-flight entertainment system based on the command signal.

8. The system of claim 7, wherein the component is powered off when the flight stage of the aircraft is at gate, take-off, or landing.

9. An in-flight entertainment system, comprising:
    an in-aircraft wireless network;
    a plurality of line-replaceable units, each comprising a computing device and a display screen;
    a first sensor configured to detect a level of vibration at or within an aircraft, and generate a first signal;
    a second sensor configured to detect a pitch of the aircraft, and generate a second signal; and
    a server having a processor configured to receive the first and second signals and determine a flight stage of the aircraft using a set of algorithms, wherein the processor is further configured to generate and transmit a command signal to cause at least one of the in-vehicle wireless network and the plurality of line-replaceable units to power on or off based on the determined flight stage.

10. The system of claim 9, wherein the processor and first and second sensors are disposed within one of the line-replaceable units.

11. The system of claim 9, wherein the processor is further configured to generate a second command signal to cause at least one of the in-vehicle wireless network and the plurality of line-replaceable units to power off based on the determined flight stage.

* * * * *